United States Patent [19]
Doyle et al.

[11] Patent Number: 4,842,186
[45] Date of Patent: * Jun. 27, 1989

[54] METHOD AND APPARATUS FOR BUILDING A WORKPIECE BY DEPOSIT WELDING

[75] Inventors: Thomas E. Doyle, Louisville, Ohio; David P. Edmonds, Jackson, Mo.; Michael D. McAninch; Patrick M. Ryan, both of Alliance, Ohio

[73] Assignee: The Babock & Wilcox Company, New Orleans, La.

[*] Notice: The portion of the term of this patent subsequent to Oct. 4, 2005 has been disclaimed.

[21] Appl. No.: 209,160

[22] Filed: Jun. 20, 1988

Related U.S. Application Data

[63] Continuation-in-part of Ser. No. 115,131, Oct. 30, 1987, Pat. No. 4,775,092.

[51] Int. Cl.[4] .................. B23K 9/04; B23K 9/225; B23K 9/32
[52] U.S. Cl. .................. 228/222; 228/242; 228/46; 228/50; 219/76.11; 219/76.12; 219/76.1; 164/479; 164/429; 164/430
[58] Field of Search .......... 228/222, 242, 46, 50, 228/48, 59, 215; 164/479, 429, 430; 219/76.11, 76.12, 76.1

[56] References Cited

U.S. PATENT DOCUMENTS

| | | | |
|---|---|---|---|
| 2,299,747 | 10/1942 | Harter | 219/76.12 |
| 3,354,937 | 11/1967 | Jackson, Jr. | 164/429 |
| 3,665,143 | 5/1972 | Ujiie | 219/76 |
| 3,834,447 | 9/1974 | Luchok et al. | 164/509 |
| 3,914,851 | 10/1975 | Ujiie | 29/412 |
| 4,237,361 | 12/1980 | Zwintscher et al. | 219/76.1 |
| 4,253,006 | 2/1981 | Ludwig | 219/76.1 |
| 4,344,556 | 8/1982 | Knapp | 228/50 |
| 4,479,602 | 10/1984 | Fernandez et al. | 228/48 |
| 4,544,019 | 10/1985 | Kodama et al. | 164/509 |
| 4,621,762 | 11/1986 | Bronowski | 219/76.11 |

FOREIGN PATENT DOCUMENTS

| | | | |
|---|---|---|---|
| 0115598 | of 1984 | European Pat. Off. | |
| 61551 | 4/1984 | Japan | 164/429 |
| 0001054 | 12/1979 | PCT Int'l Appl. | 164/429 |

OTHER PUBLICATIONS

"Shape Welding the Current Stage of the Art in the Federal Republic of Germany", Gnirss, G., May 2, 1986.

"The Production of Shape-Welded Components of Various Geometrical Shapes", Becker, R. et al., Feb. 1985.

Primary Examiner—Nicholas P. Godici
Assistant Examiner—Samuel M. Heinrich
Attorney, Agent, or Firm—Vytas R. Matas; Robert J. Edwards; Daniel S. Kalka

[57] ABSTRACT

A method and apparatus for building a workpiece of a desired geometry by deposit welding with a reusable preform. The reusable preform forms, supports, and cools the deposited molten weld material puddle while the weld material is solidifying thereby eliminating the need for a conventional preform. The reusable preform may be mobile or stationary in any shape, e.g., a block, a cylinder, or a belt. It is manufactured from either a combination of or exclusively of, a ceramic material or a material with high thermal conductivity.

24 Claims, 4 Drawing Sheets

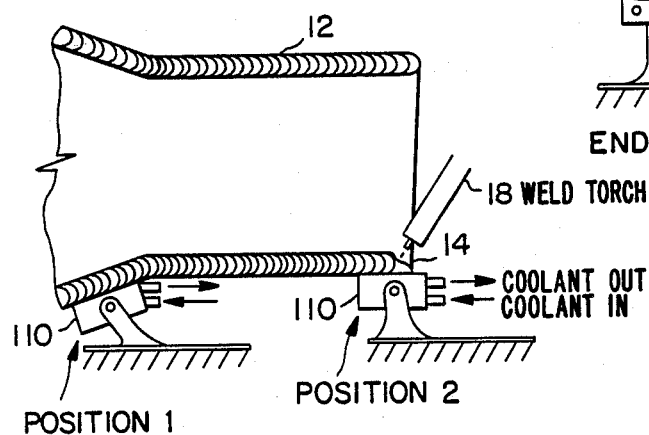
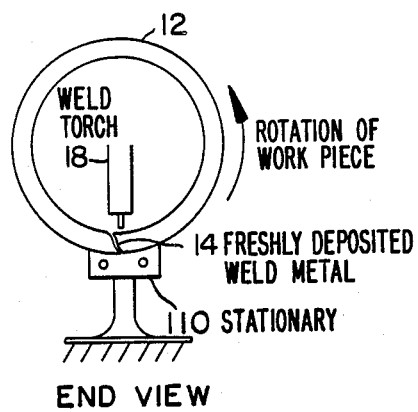
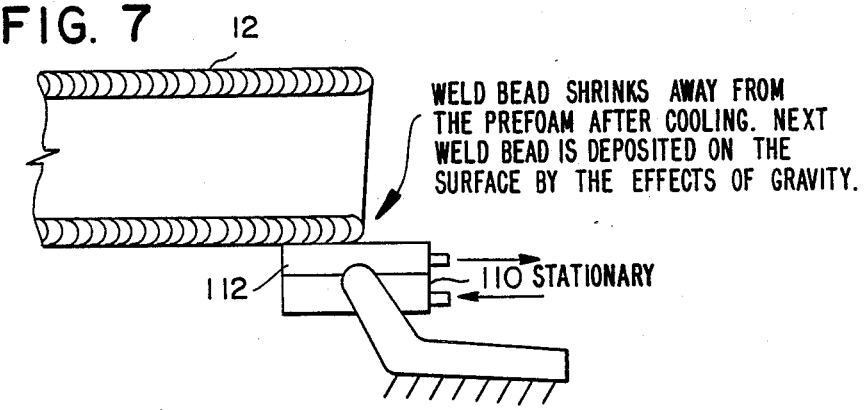

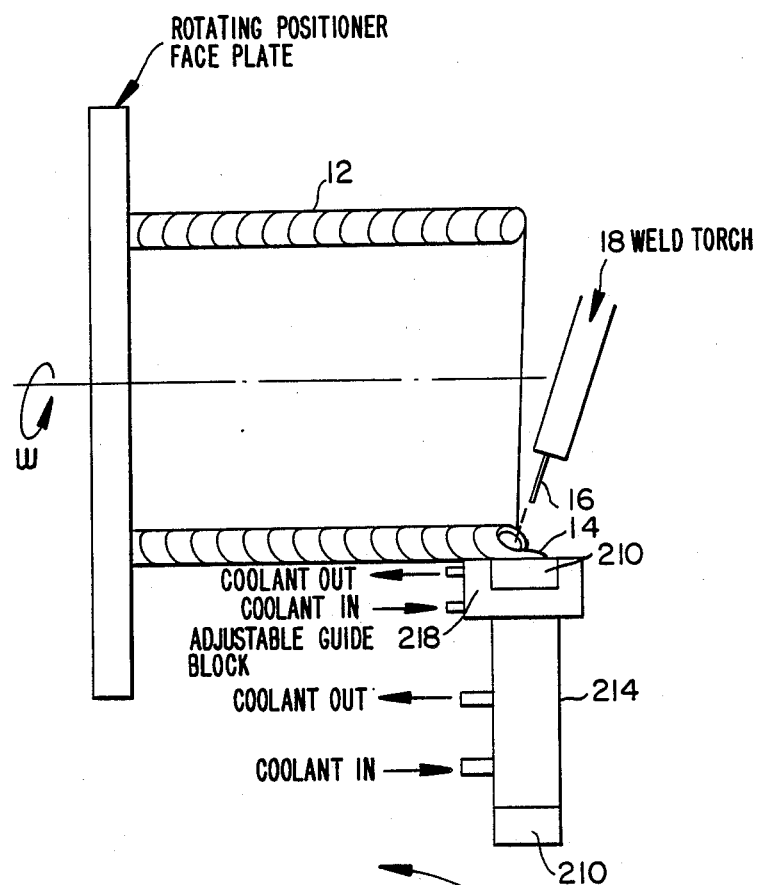
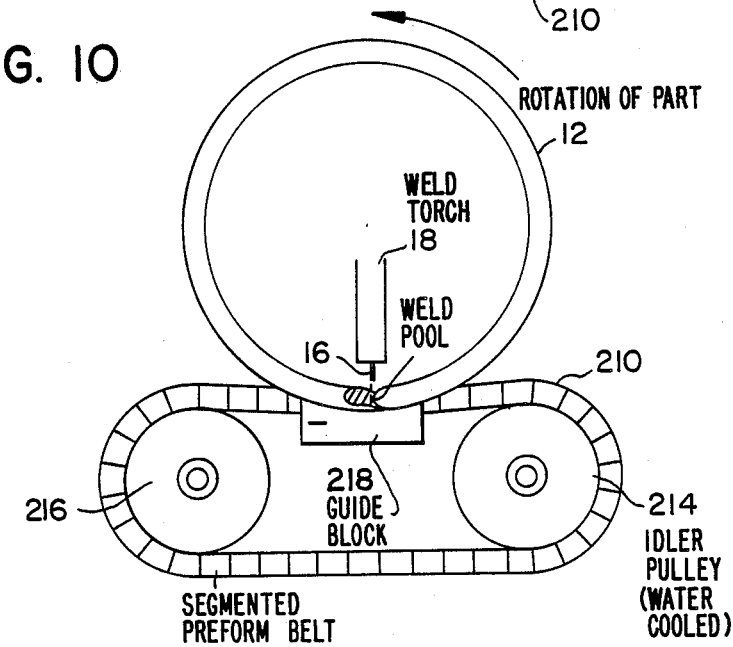

METHOD AND APPARATUS FOR BUILDING A WORKPIECE BY DEPOSIT WELDING

This is a continuation-in-part of Ser. No. 07/115,131 filed Oct. 30, 1987, now U.S. Pat. No. 4,775,092, granted Oct. 4, 1988.

BACKGROUND OF THE INVENTION

1. Field of the Invention

The present invention relates in general to an apparatus and method for building of a workpiece by deposit welding. In particular, it relates to a reusable preform for use in the shape melting welding process.

2. Description of the Related Art

Shape melting is a process whereby structural components are manufactured by depositing weld material layer-upon-layer until the desired geometry is achieved. This process offers the advantage of delivering a near-net-shape product which can be produced quickly and economically using both ferrous and non-ferrous materials.

U.S. Pat. No. 2,299,747 to Harter is directed in part to a method for forming structures wholly of fusion deposited weld metal by the arc process in successive intersecting fusion beads along a non-adherent base. A similar method is described in U.S. Pat. No. 2,912,562 to Donovan which disclosure is directed to reconditioning cylinder liners for diesel engines. The concept of forming a cylinder made up solely of welded material progressively deposited in molten form is disclosed in U.S. Pat. No. 3,558,856 to Ujiie. Million, et al, U.S. Pat. No. 4,517,434 relates to deposit welding to make a tube bend build up by a plurality of weld sections. Additionally known from U.S. Pat. No. 4,621,762 to Bronowski is the buildup of a workpiece by deposit welding using form shoes cooled by water. Along the same general lines as Ujiie, U.S. Pat. No. 4,671,448 to Million, et al describes a method of forming an element having a symmetrically curved surface by means of weld buildup and rotation of the work.

Automation and computer control can be integral parts of the shape melting process. The use of automation allows for maximum flexibility of the production station. This flexibility permits any number of different products to be manufactured without extensive retooling. Retooling in this case would be, for the most part, changing the controlling software which dictates the sequence, welding parameters, and position of welds necessary to achieve the desired final product.

Almost every facet of shape melting can involve computer control. In the incipient states of a project, design aspects would be subject to computer analysis. The results of these analyses would then be incorporated into the functions which control automation.

Implicit in the use of the above controls is the ability to deliver a final product with tailored mechanical, corrosion, and physical properties. This comes about because these properties are strongly tied to the interrelated functions of weld heat input, cooling rate, bead size, bead shape, bead sequence, and bead position. If, in addition to the above variables, one also permits controlled composition variation througout the product, it is possible, if appropriate control is exercised, for the product to have the desired combination of strength, toughness, hardness, or corrosion resistance at critical points in the product.

Weld build-up operations like shape melting require a conventional preform which is generally a machined piece of metal onto which the first layer of the build-up is deposited. It is termed a "preform" because its formed or machined shape reflects an intended final shape of the build-up.

A conventional preform serves as the support for the molten as-deposited weld metal, as the conduit for conduction cooling of the freshly deposited weld metal, as the means for restraining weld contraction stresses thereby limiting distortion of the build-up, and as the general cross-sectional shape for the weld build-up, e.g. a cylindrical build-up would require a cylinder as the starting preform.

Virtually all weld build-ups require some form of preform for any or all of the purposes stated above. In almost every instance, the surface of the conventional preform is melted by the heat of the welding arc. This melting of the surface results in a detrimental bonding of the conventional preform to the weld build-up. Further, unless the conventional preform has the same composition as the weld filler material, surface melting of the conventional preform will result in the initial layers of the build-up having a composition which includes some melted conventional preform material.

If the aforementioned composition variation is objectionable, it will be necessary to machine away the conventional preform and as many layers of the build-up as necessary to achieve an acceptable weld metal composition throughout. This loss of material and increased production time negatively impacts the economy of shape melting. As was mentioned earlier, another purpose associated with the use of a conventional preform, is that the conventional preform usually must be machined to an initial desired geometry. This implies expenses both in materials and machining time prior to shape melting. Thus, in summary, if the need for a conventional preform can be eliminated, the costs associated with both the initial and final stages of shape melting manufacturing can be reduced.

BRIEF DESCRIPTION OF THE DRAWINGS

In the drawings:

FIG. 6 is a side view of a second embodiment of the present invention showing the fabrication of transition and cylindrical sections to achieve a variable workpiece geometry;

FIG. 7 is a side view of the second embodiment with a ceramic coating of the present invention illustrating the shrinkage of the weld bead after cooling;

FIG. 8 is an end view of FIG. 6 showing the contour of the reusable preform with respect to the cylindrical section;

FIG. 9 is a side view of still another embodiment of the present invention illustrating the fabrication of a cylindrical workpiece; and FIG. 10 is an end view of FIG. 9 showing the shape welding apparatus of the present invention.

SUMMARY OF THE INVENTION

Figure 1:
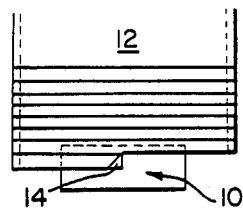
FIG. 1 is a top view of a first embodiment of the shape welding apparatus for the present invention.

The present invention resides in a reusable preform apparatus, and method of using same, for building a workpiece by deposit welding. The reusable preform provides the underlying form, necessary puddle support, and cooling for the weld metal as it is deposited and solidifies. The term "reusable preform" is meant hereinafter to be defined as serving all of the purposes of a conventional preform with the following advantages.

A first advantage is the shape of the reusable preform does not limit the shape of the workpiece as is the case with a conventional preform. The reusable preform produces a workpiece of a desired shape such as axially symmetrical and non-symmetrical components. Unlike a conventional preform, a reusable preform does not require a cylinder as the starting preform for a cylindrical build-up. As such, it eliminates the need for machining to an initial desired geometry.

A second advantage is the surface of the reusable preform does not melt during welding, never bonds to the workpiece, and does not adversely affect the composition of the as-deposited weld metal.

A third advantage is the elimination of the need to machine away the conventional preform and as many layers of the build-up as necessary to achieve an acceptable weld metal composition throughout.

These and other advantages of the present invention are thus immediately apparent. By providing a reusable preform that eliminates the need for a conventional consumable preform, the production costs associated with machining a conventional preform to a desired initial geometry for each workpiece to be manufactured are eliminated. Similarly, by preventing the reusable preform from melting in the welding arc, as is the situation when a conventional disposable preform is used, no bond forms between the reusable preform and the deposited weld metal that forms the workpiece. Thus, it eliminates contamination of the layers of the as-deposited weld metal and the subsequent machining usually required.

Accordingly, an aspect of the present invention is drawn to an apparatus for building a workpiece by deposit welding. The apparatus comprises a welding head for depositing molten weld material; a reusable preform for forming, supporting and cooling the molten weld material deposited directly on the surface thereof; and means for moving the workpiece which continuously provides a new fresh region of the reusable preform surface underneath the welding head to cool the molten weld material as it is deposited.

Another aspect of the present invention is directed to an apparatus having the above features further providing that the reusable preform may be stationary or mobile and contoured to the desired profile of the component fabricated. The reusable preform may take any form necessary for the desired component, e.g. a shoe, a cylinder, or even a belt.

Still another aspect of the present invention is drawn to a method for building a workpiece by deposit welding, comprising the steps of: depositing molten weld material onto a surface of a reusable preform; moving the workpiece during the deposition of the molten weld material on the surface of the reusable preform; and providing a new region of the reusable preform underneath the molten weld material to consistently cool and form the molten weld material as it is deposited.

The various features of novelty which characterize the invention are pointed out with particularity in the claims annexed to and forming a part of this disclosure. For a better understanding of the invention, and the operating advantages attained by its use, reference is made to the accompanying drawings and descriptive matter in which preferred embodiment of the invention is illustrated.

DETAILED DESCRIPTION OF THE INVENTION

Referring to the Figures, generally, wherein like numerals designate the same element throughout the several drawings, one aspect of the present invention is directed to a reusable preform 10 which provides the cooling, shaping, and support functions of a conventional preform without being consumed. In operation, the reusable preform 10 is held in close contact with the workpiece 12. The contact point 14 coincides with the point of weld metal deposition. In order to deposit metal, the arc is drawn between the consumable wire 16 and the edge of the existing workpiece 12. When the initial weld metal is deposited, metal deposition occurs on the edge of disposable metal starting stock. The reusable preform 10 is electrically isolated from the welding circuit, so that the arc is not drawn to it. The arc simultaneously melts a small region at the edge of the workpiece 12 and begins deposition of molten droplets 14 of the consumable wire 16. Contact of the reusable preform 10 under the deposition region is controlled in such a way as to support all the molten material which is generated and to provide a means to aid in the cooling of the hot metal. In this way, the surface of the reusable preform 10 defines the internal surface of the shape melted product.

Figure 2:
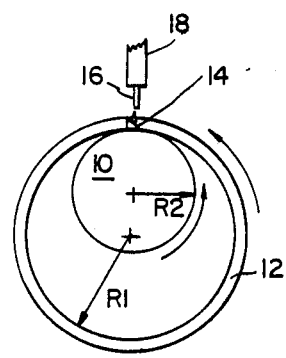
FIG. 2 is an end view of FIG. 1, showing the shape welding apparatus of the present invention according to that embodiment.
Figure 3:
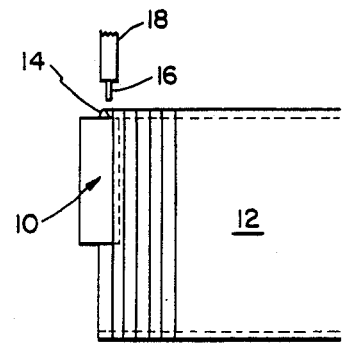
FIG. 3 is a side view of FIG. 2, showing the shape welding apparatus of the present invention according to that embodiment.

The reusable preform 10, as depicted in FIGS. 1, 2 and 3, is designed to be used in the build-up of axially symmetrical components. For this function, it takes the form of a cylinder or wheel whose external radius is less than the internal radius of the workpiece 12. For a given application there is a lower and upper limit to the allowable reusable preform 10 radius. The lower limit radius is defined by the ability of the reusable preform 10 to support and control the shape of the weld puddle. The upper limit radius is defined by the inside diameter of the component being fabricated.

In application, the reusable preform 10 is permitted to rotate freely. Rotation of the reusable preform 10 is driven by friction contact with the workpiece 12. Contact between the reusable preform 10 and the workpiece 12 is maintained by the adjustable vertical position of the cantilevered reusable preform 10. Mechanical rotation of the workpiece 12 drives the rotation of the reusable preform 10.

The welding head 18 is translated along the axis of the workpiece 12. This combination of mechanical rotation and weld head translation continuously provides a new region for deposition under the welding head 18. In this way, material is deposited in a helical or stepped fashion along the axis of the workpiece 12. In order to present a consistent reusable preform surface under the deposited material, the reusable preform 10 must be translated in conjunction with the welding head 18. The previously mentioned rotation of the reusable preform 10 is desired so that a fresh cooler reusable preform surface is continuously available to cool the newly deposited material 14. This continuous rotation makes it less likely that the reusable preform 10 will become hot enough in a localized area to melt and be consumed in the welding arc. Alternatively, rotation of the reusable preform 10 could be provided by an independent drive means (not shown) to insure constant and steady rotation during the application of the deposited weld metal to the workpiece 12.

Figure 4:
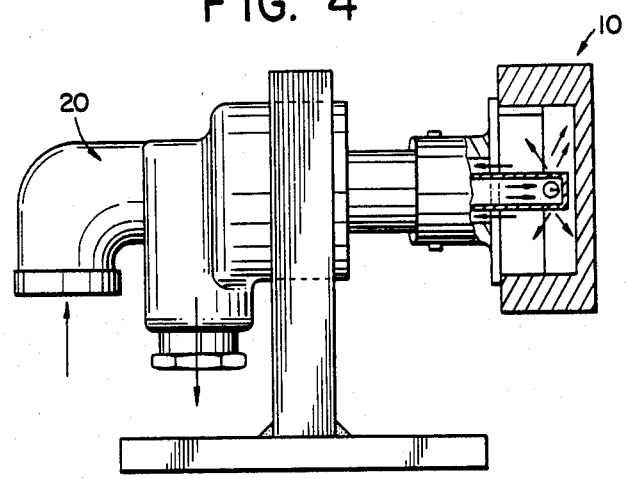
FIG. 4 is an illustration of a fluid cooled reusable preform, partly in section, according to the first embodiment of the present invention shown mounted on a rotary coupling.

To provide further assurance that the reusable preform 10 will not melt, it is manufactured from a high conductivity material, e.g. copper. Additionally, the reusable preform 10 is hollow in design, as illustrated in FIG. 4, to provide an access for internal cooling with a cooling fluid. This cooling of the reusable preform 10 is accomplished by continuously renewed cooling fluid which is circulated through the reusable preform 10 with the aid of a rotary coupling mechanism 20. A sufficiently high flow rate of cooling fluid is maintained to hold the reusable preform 10 at a consistently low temperature, thereby providing the dual benefits of providing a means to cool the deposited metal 14 and further minimizing the possibility of melting the reusable preform 10.

Figure 5:
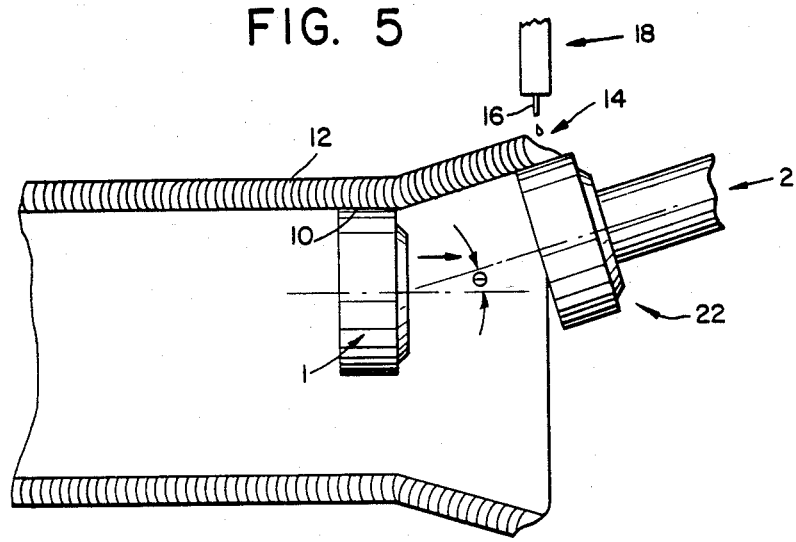
FIG. 5 is an illustration of a variable tilt angle of the first embodiment so as to achieve a variable workpiece geometry.

The cross section of the resulting workpiece 12 can be controlled by controlling the angle between the reusable preform surface 10 and the workpiece 12. Referring to FIG. 5, if it is desired to vary the internal diameter of the workpiece 12, the desired result could be accomplished by tilting the reusable preform 10 to achieve the new desired geometry achieved by tilted reusable preform 22. Thus, an additional mechanism is provided to tilt the reusable preform 10 to any desired angle while maintaining rotation, translation, and internal cooling capabilities. This same reusable preform tilting capability can also be used to accommodate and correct for changes in the product-geometry due to shrinkage strains.

The reusable preform 10, designated by numeral 110 in FIGS. 6, 7, and 8, is designed to be used in the build-up of both axially symmetrical and non-symmetrical components. For this function, it takes the form of a block which is contoured to the desired profile of the component fabricated.

The reusable preform 110 is stationary and provides the cooling, shaping, and support functions of a conventional preform without being consumed.

The reusable preform 110 operates as described earlier for the reusable preform 10. In application, the reusable preform 110 does not rotate. Although for some applications it can be transmitted axially in conjunction with the welding head 18. The reusable preform 110 is positioned and/or translated to define the desired profile of the fabricated component. Contact between the reusable preform 110 and the workpiece 12 (weld puddle) is maintained by the effects of gravity. The workpiece 12 being fabricated is rotated, while the welding head 18 and the reusable preform 110 are maintained stationary or translated axially to continuously provide a new region for deposition under the welding head 18. If the welding head 18 and reusable preform 110 are maintained stationary, then the workpiece 12 would be moved to provide this continuous new region for weld deposit.

In this application, the relative position between the welding head 18 or arc and the reusable preform 110 is maintained constant.

Welding with the reusable preform 110 located on the bottom side of the workpiece 12 is used for both axially symmetrical and nonsymmetrical component fabrication. As FIG. 6 illustrates, by incorporating horizontal and vertical flexibility into the reusable preform 110 positioning device, it is possible to vary the geometry of the workpiece 12. This is accomplished by providing a means to control the tilt or angle of the reusable preform 110. It is also possible to incorporate rotational flexibility into the reusable preform 110 positioning device.

FIG. 7 illustrates that as the weld is deposited, it lays on the reusable preform 110. As it cools, it will shrink and lift up off from the reusable preform 110 surface. The next weld bead is again deposited on the reusable preform 110, making the process self-compensating for the effect of shrinkage.

To assure that the reusable preform 110 does not melt nor adhere to the component, one embodiment is manufactured from a high thermal conductivity material such as copper for example. In the preferred embodiment, there is a ceramic coating 112 on the surface of the reusable preform 110. In a similar fashion, reusable preform 10, in FIGS. 1-5, may have a ceramic coating.

As an alternative embodiment, the entire reusable preform 10, 110 could be made from ceramic material.

The ceramic material 112 provides electrical isolation from the welding circuit, so that the arc is not drawn to the reusable preform 110. A ceramic material having a composition of about 70% silicon nitride and about 30% boron nitride allows for a machinable ceramic which may be contoured to the desired profile of the component fabricated.

Additionally, the reusable preform 110 is provided with internal passages to allow cooling fluid, such as water for example, to circulate therethrough to aid in heat removal. FIGS. 6 and 7 employ arrows to show where the coolant enters and exits the internal passages in the reusable preform 110.

Another embodiment of the present invention is illustrated in FIGS. 9 and 10. The reusable preform 10, designated by numeral 210 in FIGS. 9 and 10, has all of the features of the foregoing embodiments, that is being constructed of similar materials and operating essentially in the same manner. However, it takes the form of a belt.

The reusable preform 210 is a rotating segmented belt which provides the cooling, shaping, and support functions of a conventional preform without being consumed. As in the preceeding embodiments, in operation, a section of the reusable preform belt 210 is in close contact with the workpiece 12. It is electrically isolated from the welding circuit, so the arc is not drawn to it. The arc simultaneously melts a small region at the edge of the workpiece 12 and begins deposition of molten droplets of the consumable wire 16.

Contact of the belt segments 210 under the deposition region is controlled in such a way as to support all of the molten material which is generated and provides a means to aid in the cooling of the hot weld metal. In this way, the surface of the belt 210 defines the external surface of the weld layer being deposited for a shape melted component.

In application, the belt 210 is mechanically fixed to the desired contour of the component at the point of welding 14. The reusable preform belt 210 is driven at the same relative surface velocity as the rotating workpiece 12. The arrows in FIGS. 9 and 10 indicate the direction of rotation, but of course the direction of rotation is merely one of choice. The driving means is accomplished by using the same means or positioner which rotates the workpiece 12, or by a separate motor drive system which engages one or both of the idler pulleys 214, 216.

An adjustable guide block 218 maintains the contour of the belt 210 and position relative to the external surface of the workpiece 12.

For the fabrication of components the welding head 18 and the reusable preform belt 210 are translated along the axis, or some preplanned path, of the workpiece 12. This translation provides a continuously new region for weld metal deposition under the welding head 18. In this way, the welding material is deposited in a helical or step-over fashion along the axis or preplanned path of the workpiece. An alternate method for continuous fabrication includes maintaining the welding head 18 and belt 210 stationary while the workpiece 12 is translated in some fashion to provide a continuous new region for weld metal deposition.

Rotation of the reusable preform belt 210 is preferred so that a fresh cooler surface is continuously available to cool the newly deposited material. It also minimizes the friction, or drag, between the belt 210 and the workpiece 12. Furthermore, the continuous rotation makes it less likely that the belt 210 will become hot enough in a localized area to melt.

Additionally, the reusable preform belt 210 design includes some means for cooling. This cooling means is the form of cooled idler rollers 214, 216, and/or guide block 218, as the arrows indicate coolant flow in FIG. 9. Alternatively, a cooling tank (not shown) may be employed to surround a portion of the reusable preform belt 210.

The product cross-section of the workpiece 12 is controlled by controlling the orientation of the guide block 218 relative to the external diameter of the workpiece 12. By changing the relative position of the guide block 218, the geometry of the workpiece 12 is contoured as desired, or geometry changes due to shrinkage strains are compensated.

While specific embodiments of the invention have been shown and described in detail to illustrate the application of the principles of the invention, certain modifications and improvements will occur to those skilled in the art upon reading the foregoing description. It is thus understood that all such modifications and improvements have been deleted herein for the sake of conciseness and readability, but are properly within the scope of the following claims.

As an example of one such modification, the reusable preform belt 210 might be hollow to allow coolant from the cooling tank to flow therethrough.

What is claimed is:

1. An apparatus for building a workpiece by deposit welding, comprising:
   a welding head for depositing molten weld material;
   a reusable preform for forming, supporting and cooling the molten weld material deposited directly on the surface thereof, said reusable preform having an internal passage;
   means for cooling the hollow reusable preform by circulating a cooling fluid therethrough; and
   means for moving the workpiece which continuously provides a new region of the reusable preform surface underneath the welding head to cool the molten weld material as it is deposited.

2. An apparatus according to claim 1, wherein the reusable preform is manufactured from a high thermal conductivity material.

3. An apparatus according to claim 2, wherein the high thermal conductivity material is copper.

4. An apparatus according to claim 1, wherein the reusable preform is stationary.

5. An apparatus according to claim 1, wherein the preform includes means for electrically isolating the welding head so that the welding arc is not drawn to the preform.

6. An apparatus according to claim 5, wherein said isolating means is a ceramic material.

7. An apparatus according to claim 5, wherein the preform includes a ceramic surface portion.

8. An apparatus according to claim 6, wherein the ceramic material is composed of about 70% silicon nitride and about 30% boron nitride.

9. An apparatus according to claim 1, wherein the reusable preform includes being contoured to provide a desired shape to the workpiece.

10. An apparatus according to claim 1, further comprising means for varying the tilt angle between the reusable preform and the workpiece so as to vary the geometry of the workpiece.

11. An apparatus for building a workpiece by deposit welding comprising:
    a welding head for depositing molten weld material;
    a rotatable reusable preform for forming, supporting, and cooling the molten weld material deposited directly on the surface thereof, said reusable preform having an internal passage;
    means for cooling the hollow rotatable reusable preform by circulating a cooling fluid therethrough; and
    means for moving the workpiece which continuously provides a new region of the reusable preform surface underneath the welding head to cool the molten weld material as it is deposited.

12. An apparatus according to claim 11, wherein the rotatable reusable preform is held in friction contact with the workpiece.

13. An apparatus according to claim 11, further comprising means for translating the preform and the welding head together for continuously providing a new fresh region of the preform surface to consistently cool the molten weld material as it is deposited thereon.

14. An apparatus according to claim 12, wherein the workpiece is axially symmetrical being hollow with an internal radius R1.

15. An apparatus according to claim 14, wherein the rotatable, reusable preform is cylindrical and has an external radius R2 where R2 is less than or equal to R1.

16. An apparatus according to claim 15, wherein the external radius R2 of the preform is no less than a lower limit radius defined by the ability of the preform to support and control the shape of the deposited molten weld material.

17. An apparatus for building a workpiece by deposit welding, comprising:
    a welding head for depositing molten weld material;
    a rotatable reusable preform belt for forming, supporting, and cooling the molten weld material deposited directly on the surface thereof;

means for cooling the rotatable reusable preform belt;

means for varying the tilt angle between the reusable preform and the workpiece so as to vary the geometry of the workpiece; and means for moving the workpiece which continuously provides a new region of the rotatable reusable preform belt surface underneath the welding head to cool the molten weld material as it is deposited.

18. An apparatus according to claim 17, wherein the means for varying the tilt angle includes a guide block being situated under the rotatable reusable preform belt at the point the molten weld material is deposited thereon.

19. An apparatus according to claim 18, wherein the reusable belt includes connected segments.

20. An apparatus according to claim 19, wherein said cooling means includes idler rollers with internal passages for circulating a cooling fluid therethrough.

21. A method for building a workpiece by deposit welding, comprising the steps of:

depositing molten weld material onto a surface of a reusable preform;

cooling the reusable preform by circulating a cooling fluid therethrough so as to consistently cool the deposited molten weld material and to prevent melting of the reusable preform;

moving the workpiece during the deposition of the molten weld material on the surface of the reusable preform; and providing a new region of the reusable preform underneath the molten weld material to consistently cool and form the molten weld material as it is deposited.

22. A method according to claim 21, further comprising the step of electrically isolating the reusable preform from the welding head so that the welding arc is not drawn to the reusable preform.

23. A method according to claim 22, further comprising the step of rotating the reusable preform during deposition of the molten weld material on the surface of the reusable preform.

24. A method according to claim 23, further comprising the step of varying the tilt angle between the reusable preform surface and the workpiece during deposition of the molten weld material to vary the geometry of the workpiece.

* * * * *

UNITED STATES PATENT AND TRADEMARK OFFICE
CERTIFICATE OF CORRECTION

PATENT NO. : 4,842,186

DATED : Jun. 27, 1989

INVENTOR(S) : Thomas E. Doyle, et al.

It is certified that error appears in the above-identified patent and that said Letters Patent is hereby corrected as shown below:

On title page, item [73]
as "The Babock & Wilcox Company", it should therefor be --The Babcock & Wilcox Company--.

Signed and Sealed this

Sixteenth Day of May, 1995

Attest:

BRUCE LEHMAN

Attesting Officer

Commissioner of Patents and Trademarks